(12) United States Patent
Bushey

(10) Patent No.: US 7,325,694 B2
(45) Date of Patent: Feb. 5, 2008

(54) FLEXIBLE STRAINER

(76) Inventor: Richard D. Bushey, 1596 38th Ave., Kenosha, WI (US) 53140

(*) Notice: Subject to any disclaimer, the term of this patent is extended or adjusted under 35 U.S.C. 154(b) by 254 days.

(21) Appl. No.: 10/945,799

(22) Filed: Sep. 21, 2004

(65) Prior Publication Data
US 2006/0060522 A1 Mar. 23, 2006

Related U.S. Application Data

(60) Provisional application No. 60/504,879, filed on Sep. 22, 2003.

(51) Int. Cl.
B01D 35/02 (2006.01)

(52) U.S. Cl. ............... 210/499; 210/464; 210/465; 4/292

(58) Field of Classification Search ........... 210/499, 210/470, 483, 464, 465, 473; 99/298; 4/657, 4/654
See application file for complete search history.

(56) References Cited

U.S. PATENT DOCUMENTS

| 160,176 | A |  | 2/1875 | Fox |
| 399,321 | A |  | 3/1889 | Esmond |
| 417,636 | A |  | 12/1889 | Forth |
| 780,341 | A |  | 1/1905 | Horner |
| 852,233 | A |  | 4/1907 | Lyke |
| 950,574 | A |  | 3/1910 | Morgan |
| 1,203,530 | A |  | 10/1916 | Gessler |
| 1,688,846 | A | * | 10/1928 | Andrews ............... 210/464 |
| 2,194,653 | A | * | 3/1940 | Gell ...................... 52/662 |
| 2,586,612 | A | * | 2/1952 | Caldwell ................ 4/657 |
| 2,635,252 | A | * | 4/1953 | Gerue et al. ........... 4/657 |
| D172,450 | S | * | 6/1954 | Timmons ............... D32/57 |
| D189,148 | S | * | 11/1960 | Wille ................... D7/667 |
| 3,314,086 | A |  | 4/1967 | Minella |
| 3,788,485 | A |  | 1/1974 | Bruning |
| 5,099,527 | A |  | 3/1992 | Roose |
| 5,297,399 | A |  | 3/1994 | Tieken |
| 5,376,264 | A |  | 12/1994 | Betancourt |
| 5,815,856 | A |  | 10/1998 | Dore |
| 5,862,535 | A |  | 1/1999 | Noga et al. |
| 5,991,942 | A |  | 11/1999 | Neal |
| 6,173,455 | B1 |  | 1/2001 | Nordstrom |
| D440,127 | S | * | 4/2001 | Young et al. ........... D7/667 |
| 6,303,032 | B1 |  | 10/2001 | Genduso |

* cited by examiner

Primary Examiner—Krishnan Menon
Assistant Examiner—Benjamin Kurtz
(74) Attorney, Agent, or Firm—Boyle Fredrickson, S.C.

(57) ABSTRACT

A strainer is provided to facilitate the washing of an item in a conventional sink. The strainer includes a flexible sheet having a plurality of apertures extending therethrough. Handles project from the outer periphery of the flexible sheet to move the flexible sheet between a first position wherein the sheet is generally planer and a second position wherein the sheet forms a bag. A plurality of spacers extends from and are spaced along a first face of the sheet to space the sheet from the surface of the sink.

21 Claims, 4 Drawing Sheets

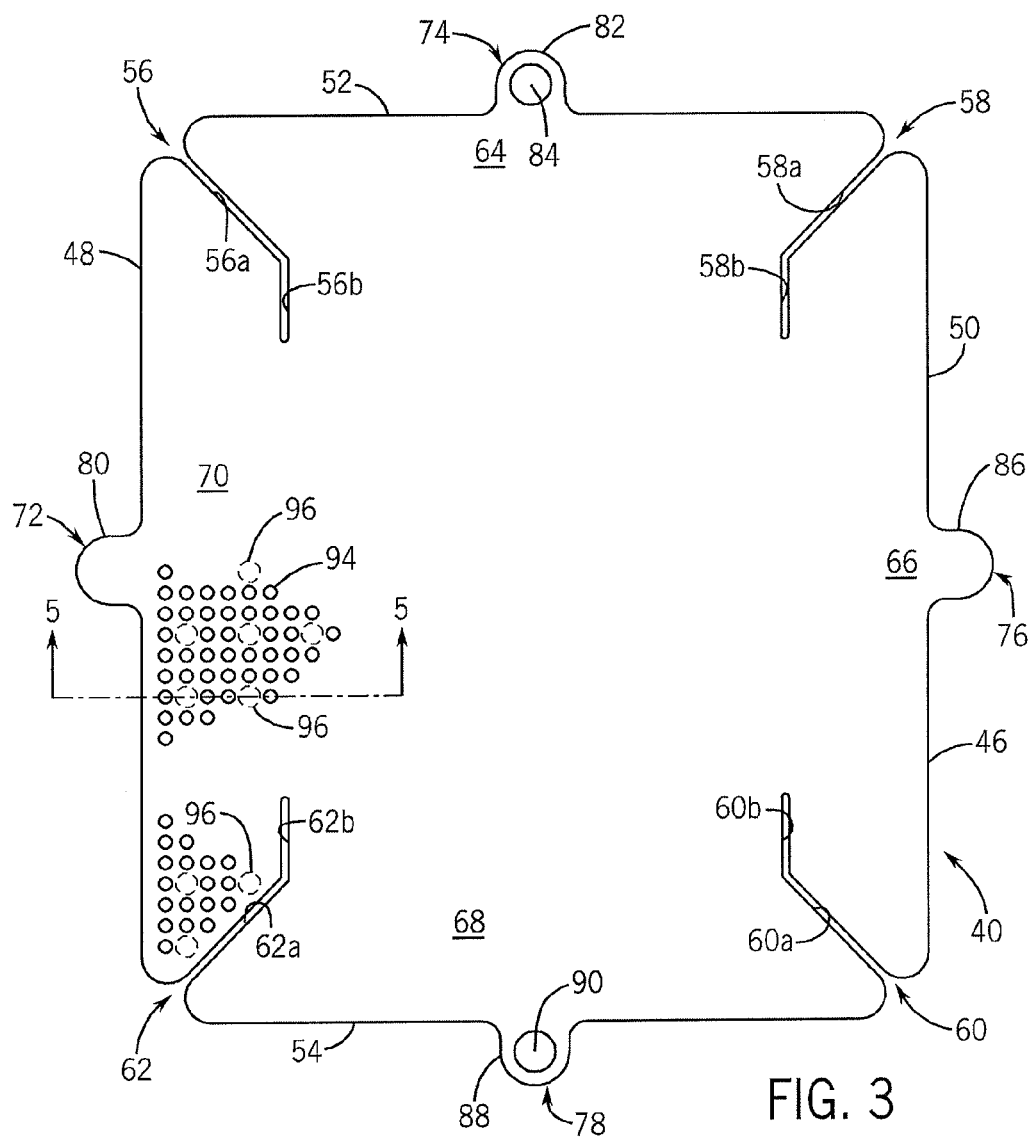
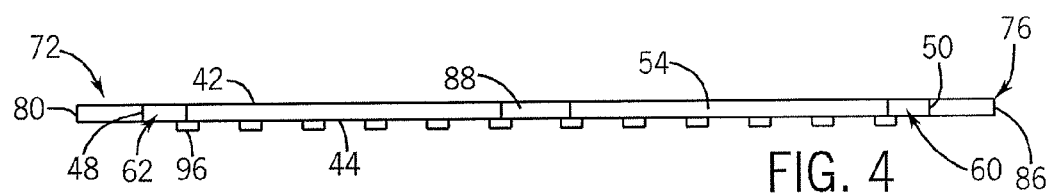
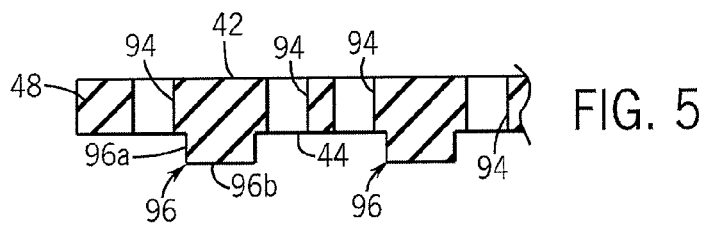

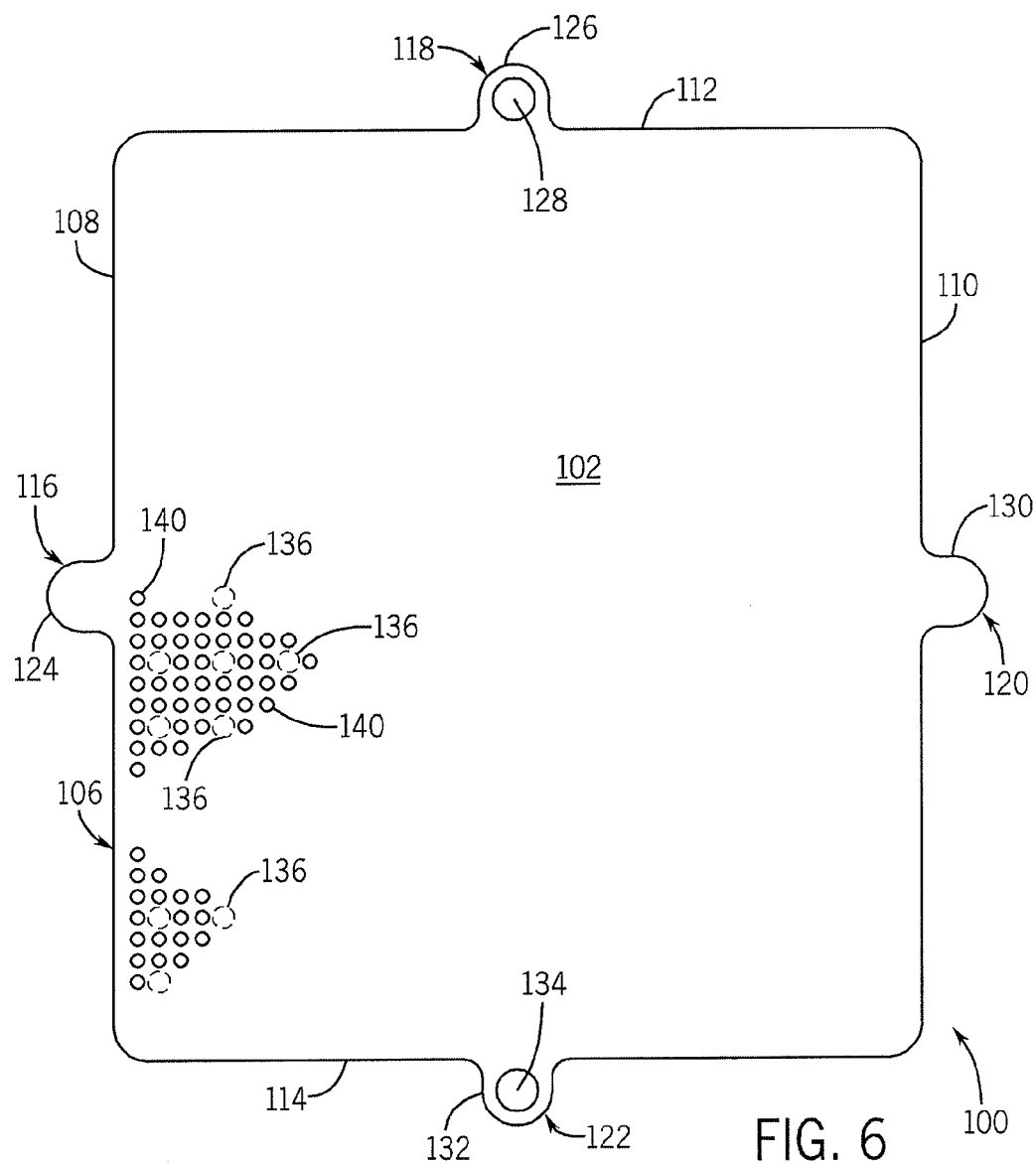
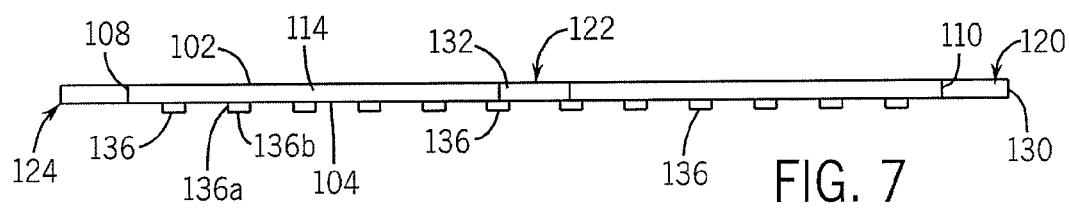

FLEXIBLE STRAINER

CROSS REFERENCE TO RELATED APPLICATION

This application claims priority from provisional application Ser. No. 60/504,879, filed Sep. 22, 2003 and entitled "Flexible Colander".

FIELD OF THE INVENTION

This invention relates generally to strainers, and in particular, to a colander or flexible strainer for preventing undesired material such as debris from flowing down and clogging the drain of a conventional sink.

BACKGROUND AND SUMMARY OF THE INVENTION

Colanders and strainers are used by individuals in a wide variety of applications. As is known, these implements capture large pieces of solid matter while simultaneously allowing liquid to pass therethrough. By way of example, food items such as vegetables or fruits may be deposited within these implements and transported to a kitchen sink. The items within the implement may then be washed therein without risk of the items going into and clogging the drain of the sink. Alternatively, the implement may be positioned within the kitchen sink to capture items such as peelings and scraps and to prevent them from passing into the drain of the sink. However, these prior implements have certain inherent limitations.

It can be appreciated that standard semi-spherical colanders or strainers provide little room for handling the food captured therein. Alternatively, flat drain guards are often complicated structures that incorporate handles and various seals to prevent the undesirable materials from flowing into the drain of the sink. By way of example, Noga et al., U.S. Pat. No. 5,862,535 discloses a drain guard that incorporates a screen for holding debris away from the sink drain. A seal is disposed between the screen and the sidewalll of the sink to prevent debris from bypassing the drain guard. In addition, the frame includes a pair of arched bands that may be used as handles for moving the drain guard into and out of the sink. However, it can be appreciated the drain guard disclosed in the Noga et al., '535 patent has a somewhat complex structure, and yet, it is still possible for debris to bypass a drain guard and flow into the kitchen sink. Consequently, it is highly desirable to provide a simpler and less expensive implement to prevent undesired material such as debris from flowing down and clogging the drain of a conventional sink.

Therefore, it is a primary object and feature of the present invention to provide a strainer that prevents undesired material and debris from flowing down and clogging a drain of conventional sink.

It is a further object and feature of the present invention to provide a strainer that functions as a carrier to transport undesired material, debris and the like captured by the strainer to a user desired location.

It is a still further object and feature of the present invention to provide a strainer the is simple to utilize and inexpensive to manufacture.

In accordance with the present invention, a strainer is provided that includes a flexible sheet having a plurality of apertures therethough and an outer periphery. First and second handles project from the outer periphery of the flexible sheet. The handles are movable between a first position wherein the first and second handles and the flexible sheet lie in a generally common plane and a second position wherein the flexible sheet forms a bag.

Preferably, the sheet is generally rectangular and includes at least first and second corners and first and second slits extending inwardly for corresponding corners of the sheet. The sheet includes first and second sides and first and second ends. The first handle projects from the first side of the sheet and the second handle projects from the second side of the sheet. The first and second handles may also include corresponding first and second openings therethrough.

The sheet of the strainer may have a plurality of different configurations. For example, the sheet may be a screen. Alternatively, the apertures through the sheet may have generally oblong shapes or be formed from intersecting slots in the sheets. A plurality of spacers extend from and are spaced along a first face of the sheet and a border may extend about the outer periphery of the sheet.

In accordance with a further aspect of the present invention, a strainer is provided that includes a flexible sheet defined by first and second sides, first and second ends, and first and second faces. The sheet includes a plurality of apertures therethough; a first side handle adjacent the first side of the sheet; a second side handle adjacent the second side of the sheet; a first end handle adjacent the first end of the sheet; and a second end handle adjacent the second end of the sheet. The first and second side handles and the first and second end handles are movable between first positions wherein the first and second handles, the first and second end handles, and the flexible sheet lie in a generally common plane and second positions wherein the flexible sheet forms a bag.

The sheet of the strainer includes a first corner that has a slit formed therein. The slit has a first portion at a predetermined angle to the first side of the sheet and a second portion generally parallel to the first side of the sheet. The predetermined angle is in the range of 30 degrees and 60 degrees.

The sheet of the strainer may have a plurality of different configurations. For example, the sheet may be a screen. Alternatively, the apertures through the sheet may have generally oblong shapes or be formed from intersecting slots in the sheets. A plurality of spacers extend from and are spaced along a first face of the sheet and a border may extend about the outer periphery of the sheet.

In accordance with a still further aspect of the present invention, a strainer is provided that includes a flexible sheet defined by first and second sides, first and second ends, and first and second faces. A plurality of apertures extend though the sheet.

The sheet of the strainer includes a first corner having a slit formed therein. The slit has a first portion at a predetermined angle to the first side of the sheet and a second portion generally parallel to the first side of the sheet. The predetermined angle is in the range of 30 degrees and 60 degrees.

A plurality of handles are operatively connected to the sheet to move the sheet between a first generally flat configuration and a second bag-shaped configuration. In addition, a border extends about the sheet between the sheet and the plurality of handles. The sheet of the strainer may have a plurality of different configurations. For example, the sheet may be a screen. Alternatively, the apertures through the sheet may have generally oblong shapes or be formed from intersecting slots in the sheets.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 3 is a top plan view of an alternate embodiment of a strainer in accordance with the present invention;

FIG. 4 is an end view of the strainer of FIG. 3;

FIG. 5 is a cross-sectional view of the strainer of the present invention along line 5-5 of FIG. 3;

FIG. 6 is a top plan view of a third embodiment of a strainer in accordance with the present invention;

FIG. 7 is an end view of the strainer of FIG. 6;

DETAILED DESCRIPTION OF THE DRAWINGS

Figure 1:
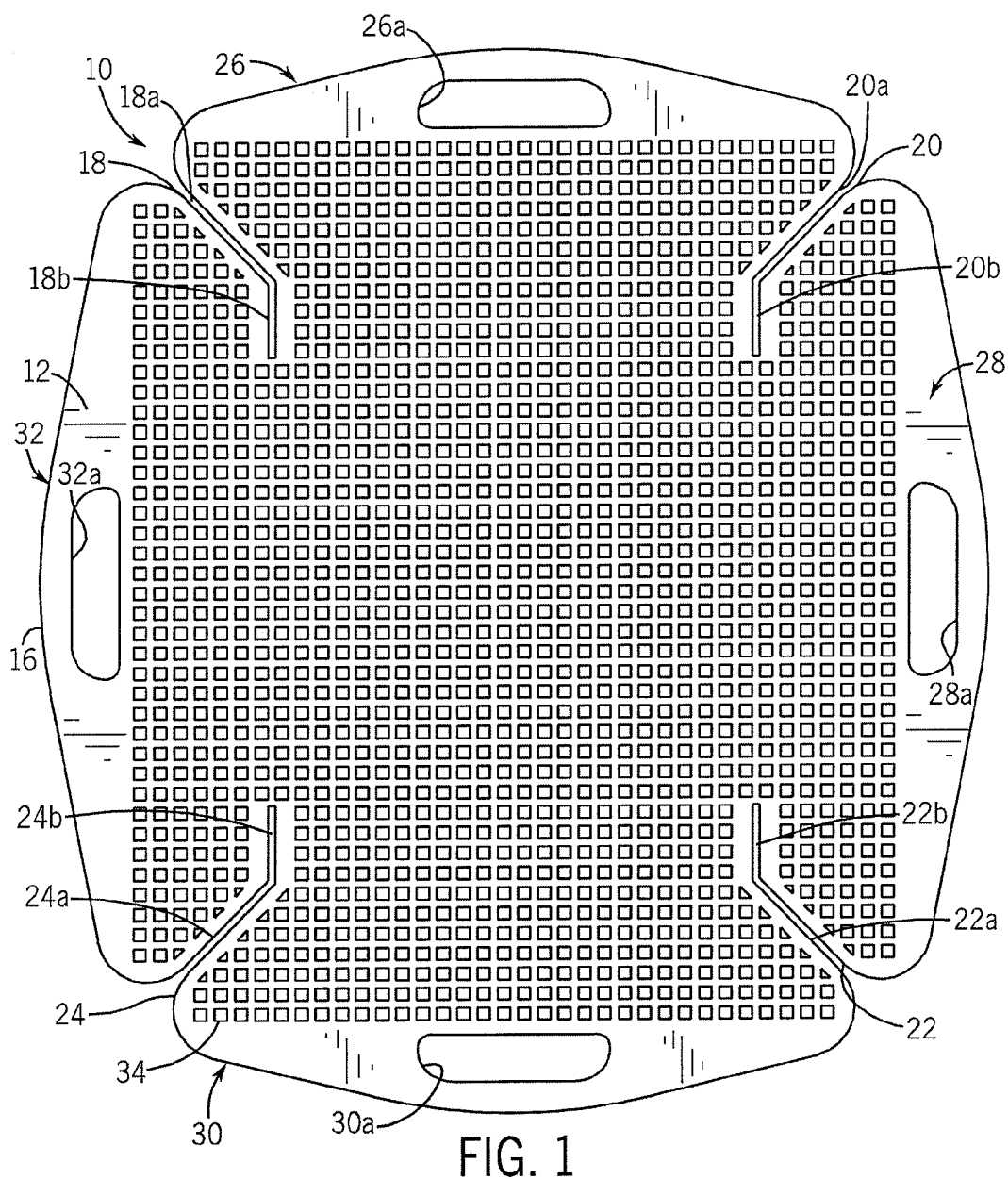
FIG. 1 is a top plan view of a strainer in accordance with the present invention.
Figure 2:
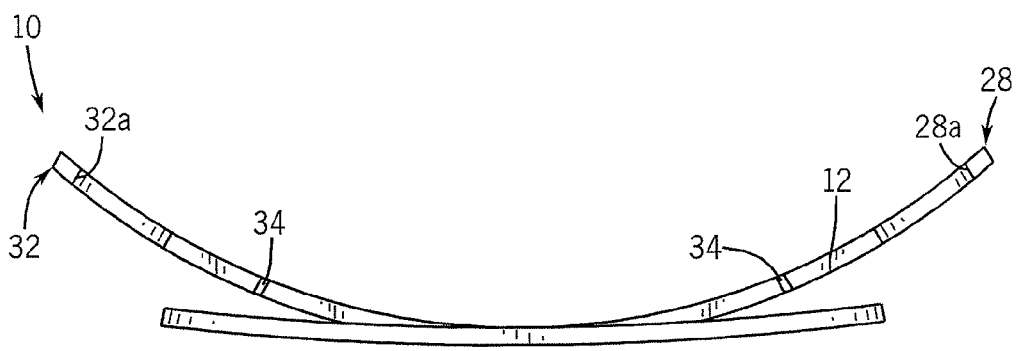
FIG. 2 is an end view of the strainer of FIG. 1.

Referring to FIGS. 1 and 2, a flexible strainer in accordance with the present invention is generally designated by the reference numeral 10. Strainer 10 is formed from a pliable material such as rubber or an elastomeric polymer, and includes first upper surface 12 and second lower surface 14 interconnected by outer edge 16. Outer edge 16 of strainer 10 includes four circumferentially spaced slots 18, 20, 22 and 24 formed therein. Slot 18 includes first portion 18a directed toward the center of strainer 10 and second portion 18b at an angle thereto. Slot 20 includes first portion 20a directed toward the interior of strainer 10 and second portion 20b which extends at an angle to first portion 20a of slot 20 and which is generally parallel to second portion 18b of slot 18. Slots 18 and 20 define first folding portion 26 of strainer 10.

Slot 22 includes first portion 22a directed toward the interior of strainer 10 and second portion 22b that extends from first portion 22a at an angle thereto. Second portion 22b of slot 22 is generally parallel to second portion 18b of slot 18 and lies along a common axis with second portion 20b of slot 20. Slot 20 and slot 22 define second folding portion of strainer 10.

Slot 24 includes first portion 24a directly toward the interior of strainer 10 and second portion 24b that extends from first portion 24a at an angle thereto. Second portion 24b of slot 24 lies along a common axis with second portion 18 of slot 18b and is generally parallel to second portions 20b and 22b of slots 20 and 22, respectively. Slots 22 and 24 define third folding portion 30 of strainer 10 therebetween. In addition, slot 18 and slot 24 define fourth folding portion 32 therebetween.

Each folding portion 26, 28, 30 and 32 includes a corresponding opening 26a, 28a, 30a and 32a, respectively, therethrough which allows a user to grasp strainer 10. More specifically, utilizing openings 24a, 28a, 30a and 32a in corresponding folding portions 26, 28, 30 and 32, folding portions 26, 28, 30 and 32 may be folded toward each other by a user such that strainer 10 forms a basket like configuration to capture any items positioned on upper surface 12 thereof. It can be appreciated folding portions 28 and 32 of strainer 10 are foldable from a generally flat configuration, FIG. 1, to a folded configuration, FIG. 2.

Strainer 10 further includes a plurality of apertures 34 therethrough. It is intended that apertures 94 extending through strainer 10 allow for fluid, such as wash water, to pass therethrough, while preventing articles on upper surface 12 from passing therethrough.

In operation, strainer 10 is positioned on the surface of a conventional sink so as to overlap the drain thereof. As an individual prepares a meal, debris such as leaves, husks, rinds, may be deposited in the sink on upper surface 12 of strainer 10. As the food is washed, water flows through apertures 34 in strainer 10 down the drain of the sink. However, the debris is retained on upper surface 12 of strainer 10. Once preparation of the meal is completed, the individual grasps folding portions 26, 28, 30 and 32 through corresponding openings 26a, 28a, 30a and 32a, respectively, and folds folding portions 26, 28, 30 and 32 to form a basket and capture the debris therein. The individual user may then transport the debris to a refuge container thereby preventing the debris from passing into and clogging the drain of the sink.

Alternatively, strainer 10 may be placed over the drain of a conventional sink. Thereafter, foodstuffs or other user-desired articles may be positioned on upper surface 12 of strainer 10 thereby allowing an individual to wash the articles within the sink without fear of such articles flowing into the drain. It is noted, however, that the wash water will flow through apertures in strainer 10 into the drain. Once the articles have been washed, the individual may grasp folding portions 26, 28, 30 and 32 through corresponding openings 26a, 28a, 30a and 32a, respectively, and fold folding portions 26, 28, 30 and 32 to form a basket for carrying the articles to another desired location. Once again, it can be appreciated that strainer 10 prevents undesired materials from flowing into the drain of the sink.

Referring to FIGS. 3-5, an alternate embodiment of a flexible strainer in accordance with the present invention is generally designated by the reference numeral 40. Strainer 40 is formed from a pliable material such as rubber or an elastomeric polymer and includes upper surface 42 and second lower surface 44 interconnected by outer edge 46. Outer edge 46 has a generally rectangular configuration and defined by generally parallel sides 48 and 50 and generally parallel ends 52 and 54. Outer edge 46 further includes four circumferentially spaced slots 56, 58, 60 and 62 formed therein. Slot 56 includes first portion 56a extending from the intersection of side 48 and end 52 toward the interior of strainer 40 at an angle of approximately 45 degrees to side 48. Second portion 56b of slot 56 extends from first portion 56a of slot 56 and is generally parallel to side 48. Slot 58 includes first portion 58a extending from the intersection of side 50 and end 52 toward the interior of strainer 40 at an angle of approximately 45 degrees to side 50. Second portion 58b of slot 58 extends from first portion 58a and is generally parallel to second portion 56b of slot 56 and to side 58. Slots 56 and 58 define first folding portion 64 of strainer 40.

Slot 60 includes first portion 60a extending from the intersection of side 50 and end 54 towards the interior of strainer 40 at an angle of approximately 45 degrees to side 50. Second portion 60b of slot 60 extends from first portion 60a of slot 60 and lies along a common axis with second portion 58b of slot 58. Slot 58 and slot 60 define second folding portion 66. Slot 62 includes first portion 62a extending from the intersection of side 48 and end 54 towards the interior of strainer 40 at an angle of approximately 45 degrees to side 48. Second portion 62b of slot 62 extends from first portion 62a of slot 62 and lies along a common axis with second portion 56b of slot 56. Second portion 62b of slot 62 is generally parallel to second portions 58b and 60b of slots 58 and 60, respectively, and to sides 48 and 50. Slot 60 and slot 62 define third folding portion 68 of strainer 40. In addition, slot 56 and slot 62 define fourth folding portion 70 of strainer 40.

Strainer 40 further includes circumferentially spaced tabs 72, 74, 76 and 78 extending radially outwardly from outer edge 46 of strainer 40. Tab 72 is centered along and extends from side 48 of strainer 40. Tab 72 is defined by a generally arcuate outer edge 80. Tab 74 is centered along and extends from end 52 of strainer 40. Tab 74 is defined by a generally arcuate outer edge 82 and includes aperture 84 extending therethrough, for reasons hereinafter described. Tab 76 is centered along and extends from side 50 of strainer 40. Tab 76 is defined by a generally arcuate outer edge 86. Tab 78 is centered along and extends from end 54 of strainer 40. Tab 78 is defined by generally arcuate outer edge 88 and includes aperture 90 extending therethrough for reasons hereinafter described.

Strainer 40 further includes a plurality of apertures 94 extending therethrough between upper surface 42 and lower surface 44. It is intended that apertures 94 extending through strainer 10 allow for fluid, such as wash water or the like, to pass therethrough, while preventing articles on upper surface 42 of strainer 40 from passing therethrough. Strainer 40 also includes a plurality of stands 96 depending from lower surface 44 of strainer 40. Stands 96 are spaced along lower surface 44 of strainer 40 in a user desired pattern. By way of example, each stand 96 has a generally cylinder configuration defined by generally cylinder side wall 96a and terminal end 96b. However, it is contemplated for stands 96 to have alternate configurations, such as having a generally rectangular cross section without deviating from the scope of the present invention.

As described, tabs 72, 74, 76 and 78 allow a user to grasp strainer 40. More particularly, tabs 72, 74, 76 and 78 may be used by a user to fold strainer between a generally flat configuration, FIG. 4, wherein strainer 10 lies in a single plane, and a bag-like configuration wherein folding portions 64, 66, 68 and 70 are folded toward each other by a user such that strainer 40 forms a bag-like configuration capturing any items positioned on upper surface 42 thereof. In its bag-like configuration, tabs 72 and 76 are brought into contact with each other. Similarly, tabs 74 and 78 are brought into contact with each other. Apertures 84 and 90 through tabs 74 and 78, respectively, allow a user to grasp tabs 74 and 78. In addition, apertures 84 and 90 through tabs 74 and 78, respectively, facilitate the grasping of 74 and 78 by means of a fastening device in order to maintain folding portions 64 and 68 in their folded configuration.

In operation, strainer 10 is positioned on a surface of a conventional sink so as to overlap the drain thereof. Stands 96 space lower surface 44 of strainer 40 from the surface of the conventional sink so as to allow wash water to flow therebetween. With strainer 40 positioned on the surface of the conventional sink, the item to be washed may be placed on upper surface 42 of strainer 40. Thereafter, wash water, may be directed towards the item so as to wash the same. As the item is washed, the wash water flows through apertures 94 in strainer 40 and between lower surface 44 of strainer 40 and the surface of the conventional sink into the drain of the sink. It is noted that, however, the item washed is retained on upper surface 42 of strainer 40. Once the item has been washed, an individual may grasp tab 72, 74, 76 and 78 so as to fold folding portions 64, 66, 68 and 70 of strainer 40 such that strainer 40 assumes the bag-like configuration heretofore described so as to capture the item therein. The individual may then transport the item to a user desired location to dry.

Referring to FIGS. 6-7, an alternate embodiment of the strainer in accordance with the present invention is generally designated by the reference numeral 100. Strainer 100 is formed from a pliable material such as rubber and elastomeric polymer, and includes upper surface 102 and lower surface 104 interconnected by outer edge 106. Outer edge 106 of strainer 100 is defined by first and second sides 108 and 110, respectively, and first and second ends 112 and 114, respectively. Circumferentially spaced tabs 116, 118, 120 and 122 extend radially outward from outer edge 106. Tab 116 is centered along and extends from first side 108. Tab 116 is defined by a generally arcuate outer edge 124. Tab 118 is centered along and extends from first end 112 of first end 112 of strainer 100. Tab 118 is defined by generally arcuate outer edge 126 and includes central aperture 128 extending therethrough. Tab 120 is centered along and extends from second side 110. Tab 120 is defined by generally arcuate outer edge 130. Tab 122 is centered along and extends from second end 114. Tab 122 is defined by an arcuate outer edge 132 and includes central aperture 134 extending therethrough.

Strainer 100 further includes a plurality of stands 136 depending from lower surface 104 of strainer 100. Stands 136 are spaced along the entirety of lower surface 104 and are intended to space lower surface 104 of strainer 100 from a supporting surface such as the surface of a conventional sink. By way of example, each stand 136 has a generally cylindrical configuration defined by generally cylindrical side wall 136a and a generally flat terminal end 136b. However, other configurations of stands 136 are possible without deviating from the scope of the present invention.

Figure 8:
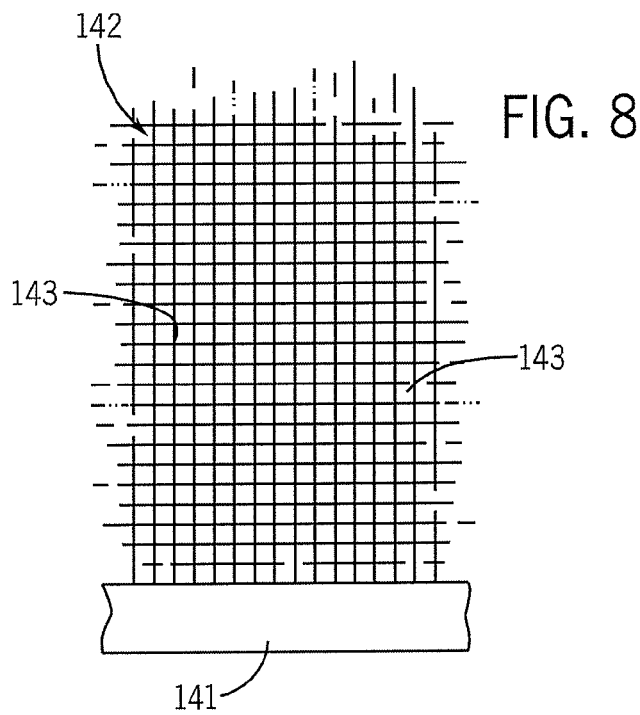
FIG. 8 is a top plan view of a screen for use with the strainers of the present invention.
Figure 9:
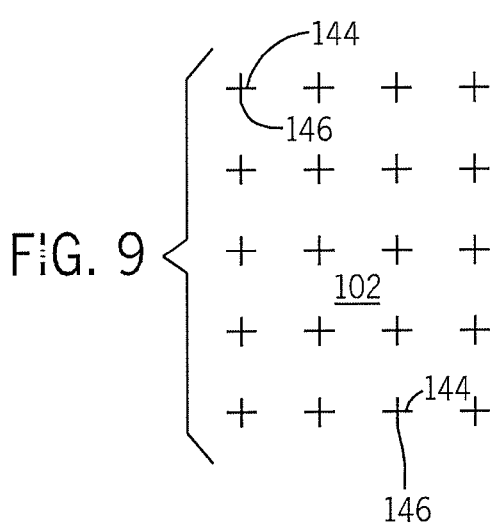
FIG. 9 is a first alternate embodiment of the apertures extending through the strainer of the present invention.
Figure 10:
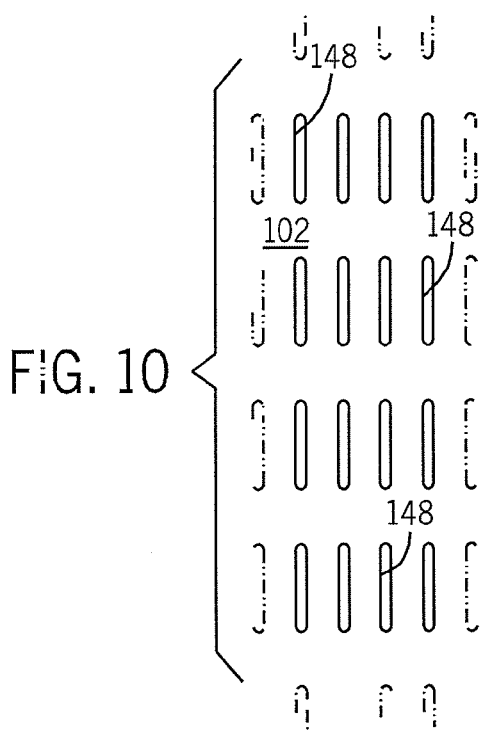
FIG. 10 is a second alternate embodiment of the apertures extending through the strainer of the present invention.

Strainer 100 further includes a plurality of apertures 140 extending through strainer 100 between upper surface 102 and lower surface 104. Between first and second sides 108 and 110, respectively, as well as, the first and second ends 112 and 114, respectively. As best seen in FIG. 6, it is contemplated for apertures 140 to have a generally circular cross-section. However, apertures 140 may have other configurations. By way of example, referring to FIG. 5, strainer 100 may take the form of a screen generally designated by the reference numeral 142 having boarder 141 extending about the outer periphery thereof and defining sides 108 and 110 and ends 112 and 114 of screen 100. As is conventional, screen 142 defines a plurality of apertures 143 having a generally square cross-section. Referring to FIG. 9, it is contemplated for the apertures through strainer 100 to take the form of first and second intersecting slots 144 and 146 extending between upper surface 102 and lower surface 104 of strainer 100. By way of example, slots 144 and 146 may be generally perpendicular to each other, but other configurations are possible within the scope of the present invention. Alternatively, strainer 100 may include generally oblong apertures 148, FIG. 10, extending between upper surface 102 and lower surface 104 of strainer 100 and spaced between first and second sides 108 and 110, respectively, as well as, first and second ends 112 and 114, respectively. While screen 142, FIG. 8; intersecting slots 144 and 146, FIG. 9, and oblong openings 148, FIG. 10, are described in connection with strainer 100, it can be appreciated that such structures may be incorporated into strainer 10 and/or strainer 40, heretofore described, without deviating from the scope of the present invention.

In operation, strainer 100 is positioned on the surface of a conventional sink so as to overlap the drain thereof and such that terminal ends 136b of stands 136 engage the surface of the conventional sink. Stands 136 space lower surface 104 of strainer 100 from the surface of the conventional sink. Thereafter, an individual may deposit an item to be washed in the sink on upper surface 102 of strainer 100. The item is washed with wash water and the used wash water passed through apertures 140 in strainer 100, between lower surface 104 of strainer 100 and the surface of the conventional sink, and into the drain of the sink. Once the item is washed, the individual may grasp tabs 116, 118, 120 and 122 to fold strainer 100 into a bag-like configuration. In its bag-like configuration, tab 116 and tab 118 are positioned adjacent each other and tabs 118 and 122 are positioned adjacent one another. It is contemplated to extend a fastening device through apertures 128 and 134 in tabs 118 and 122, respectively, to maintain strainer 100 in its bag-like configuration. With strainer 100 in its bag-like configuration, an individual may transport the item captured therein to a user-desired position.

Various alternatives are contemplated as being within the following claims particularly pointing out and distinctly claiming the subject matter regarded as the invention.

I claim:

1. A strainer, comprising:
    a generally rectangular, flexible sheet having a plurality of apertures therethough and an outer periphery, the sheet defined by first and second generally parallel sides and first and second generally parallel ends perpendicular to the sides; and
    first and second flexible handles projecting from the outer periphery of the flexible sheet and including corresponding apertures therethrough, the handles movable between a first position wherein the first and second handles and the flexible sheet lie in a generally common plane and second position wherein the flexible sheet forms a bag; and
    wherein the sheet includes:
        a first slit having a first end communicating with a first corner of the sheet and a second end, the first slit extending along an axis at an acute angle to the first and second sides and the first and second ends; and
        a second slit having a first end communicating with the second end of the first slit and a second end, the second slit extending along an axis that is generally parallel to the first and second sides and perpendicular to the first and second ends.

2. The strainer of claim 1 wherein the first handle projects from the first side of the sheet and the second handle projects from the second side of the sheet.

3. The strainer of claim 1 wherein the sheet is a screen.

4. The strainer of claim 1 wherein the apertures in the sheet have a generally oblong shape.

5. The strainer of claim 1 wherein the sheet includes first and second faces, and wherein the strainer further comprises a plurality of spacers extending from and spaced along the first face of the sheet.

6. The strainer of claim 1 wherein each aperture is defined by first and second intersecting slots in the sheet.

7. The strainer of claim 1 further comprising a border extending about the outer periphery of the sheet.

8. A strainer, comprising:
    a flexible sheet defined by first and second sides, first and second ends, and first and second faces, the sheet including a plurality of apertures therethough;
    a flexible, first side handle adjacent the first side of the sheet, the first side handle including an opening therethrough;
    a flexible, second side handle adjacent the second side of the sheet, the second side handle including an opening therethrough;
    a flexible, first end handle adjacent the first end of the sheet, the first end handle including an opening therethrough; and
    a flexible, second end handle adjacent the second end of the sheet, the second end handle including an opening therethrough;
    wherein:
        the first and second side handles and the first and second end handles are movable between first positions wherein the first and second side handles, the first and second end handles, and the flexible sheet lie in a generally common plane and second positions wherein the flexible sheet forms a bag; and
        the sheet includes:
            a first slit having a first end communicating with a first corner of the sheet and a second end, the first slit extending along an axis at an acute angle to the first and second sides and the first and second ends; and
            a second slit having a first end communicating with the second end of the first slit and a second end, the second slit extending along an axis that is generally parallel to the first and second sides and perpendicular to the first and second ends.

9. The strainer of claim 8 wherein the acute angle of the first slit to the first side of the sheet is in the range of 30 degrees and 60 degrees.

10. The strainer of claim 8 wherein the sheet is a screen.

11. The strainer of claim 8 wherein the apertures in the sheet have a generally oblong shape.

12. The strainer of claim 8 further comprising a plurality of spacers extending from and spaced along the first face of the sheet.

13. The strainer of claim 8 wherein each aperture is defined by first and second intersecting slots in the sheet.

14. The strainer of claim 8 further comprising a border extending about the sheet between the sheet and the first and second side handles.

15. A strainer, comprising:
    a flexible sheet defined by first and second sides, first and second ends, and first and second faces, the sheet including a plurality of apertures therethough;
    a plurality of spacers extending from and spaced along the first face of the sheet; and
    wherein
        the sheet includes a first corner and has a slit formed therein, the slit having:
            a first portion extending along an axis at a predetermined angle to the first side of the sheet, the first portion having a first end opening to the first corner and a second end; and
            a second portion extending along an axis parallel to the first side of the sheet, the first portion having a first end communicating with the second end of the first portion and a second end; and
        a portion of the apertures in the sheet are positioned on opposite sides of the slit.

16. The strainer of claim 15 wherein the predetermined angle is in the range of 30 degrees and 60 degrees.

17. The strainer of claim 15 further comprising a plurality of handles operatively connected to the sheet to move the sheet between a first generally flat configuration and a second bag-shaped configuration.

18. The strainer of claim 17 further comprising a border extending about the sheet between the sheet and the plurality of handles.

19. The strainer of claim 15 wherein the sheet is a screen.

20. The strainer of claim 15 wherein the apertures in the sheet have a generally oblong shape.

21. The strainer of claim 15 wherein each aperture is defined by first and second intersecting slots in the sheet.

* * * * *